(12) United States Patent
Babb et al.

(10) Patent No.: US 7,494,040 B2
(45) Date of Patent: Feb. 24, 2009

(54) FRICTION STIR WELDING IMPROVEMENTS FOR METAL MATRIX COMPOSITES, FERROUS ALLOYS, NON-FERROUS ALLOYS, AND SUPERALLOYS USING A SUPERABRASIVE TOOL

(75) Inventors: Jonathan A. Babb, Isamas, UT (US); Brian E. Taylor, Draper, UT (US); Russell J. Steel, Salem, UT (US); Chris Reed, Salem, UT (US); Scott M. Packer, Alpine, UT (US)

(73) Assignees: SII MegaDiamond, Inc., Provo, UT (US); Advanced Metal Products, Inc., West Bountiful, UT (US)

( * ) Notice: Subject to any disclaimer, the term of this patent is extended or adjusted under 35 U.S.C. 154(b) by 0 days.

(21) Appl. No.: 10/952,548

(22) Filed: Sep. 27, 2004

(65) Prior Publication Data

US 2005/0082342 A1  Apr. 21, 2005

Related U.S. Application Data

(60) Provisional application No. 60/506,685, filed on Sep. 25, 2003.

(51) Int. Cl.
*B23K 20/12* (2006.01)
(52) U.S. Cl. .................... 228/2.1; 228/112.1
(58) Field of Classification Search .......... 228/112.1, 228/212, 213, 49.3
See application file for complete search history.

(56) References Cited

U.S. PATENT DOCUMENTS

| | | | | |
|---|---|---|---|---|
| 3,425,614 | A * | 2/1969 | Clark | 228/49.3 |
| 3,561,320 | A * | 2/1971 | Nelson et al. | 228/213 |
| 4,560,931 | A * | 12/1985 | Murakami et al. | 324/220 |
| 5,425,491 | A * | 6/1995 | Tanaka et al. | 228/44.7 |
| 5,829,664 | A * | 11/1998 | Spinella et al. | 228/112.1 |
| 6,050,474 | A * | 4/2000 | Aota et al. | 228/112.1 |
| 6,259,052 | B1 | 7/2001 | Ding et al. | |
| 6,450,395 | B1 * | 9/2002 | Weeks et al. | 228/112.1 |
| 6,484,924 | B1 | 11/2002 | Forrest | |
| 6,581,819 | B1 | 6/2003 | Aota et al. | |
| 6,601,751 | B2 | 8/2003 | Iwashita et al. | |
| 6,915,943 | B2 * | 7/2005 | Laing | 228/212 |
| 2002/0011509 | A1 * | 1/2002 | Nelson et al. | 228/112.1 |
| 2002/0014516 | A1 * | 2/2002 | Nelson et al. | 228/112.1 |
| 2005/0249978 | A1 * | 11/2005 | Yao | 428/699 |

FOREIGN PATENT DOCUMENTS

| | | | |
|---|---|---|---|
| GB | 2261623 A | * | 5/1993 |
| JP | 2003326372 A | * | 11/2003 |
| WO | WO 92/03247 | | 3/1992 |

* cited by examiner

*Primary Examiner*—Kiley Stoner
(74) *Attorney, Agent, or Firm*—Morriss O'Bryant Compagni

(57) ABSTRACT

A friction stir welding system that enables clamping of a pipe to enable friction stir welding around the pipe OD, a movable mandrel that provides a counter-force to the pressure exerted on the outside of a pipe by a tool, and a system for providing friction stir welding and repair inside a nuclear vessel in an underwater environment.

13 Claims, 17 Drawing Sheets

FRICTION STIR WELDING IMPROVEMENTS FOR METAL MATRIX COMPOSITES, FERROUS ALLOYS, NON-FERROUS ALLOYS, AND SUPERALLOYS USING A SUPERABRASIVE TOOL

CROSS REFERENCE TO RELATED APPLICATIONS

This application claims benefit of provisional application No. 60/506,685 which was filed on Sep. 25, 2003.

This document incorporates by reference all of the subject matter filed in U.S. Pat. Ser. Nos. 6,648,206, in 6,779,704, and in U.S. patent application Ser. Nos. 10/846,825, and 10/912,736.

BACKGROUND OF THE INVENTION

1. Field of the Invention

This invention relates generally to friction stir welding. More specifically, the present invention addresses improvements in all aspects of friction stir welding of stainless steel and other materials that are harder than aluminum, wherein the improvements are focused on composite tools, control systems for friction stir welding machines, the use of fluids that can affect friction stir welding performance, modification of the hardness of friction stir welds, friction stir welding of pipe, the use of electric currents to affect the quality of friction stir welds, a mandrel for use in friction stir welding in pipes, improvements in friction stir welding of pipe, alternate spindle heads for use in friction stir welding, and consumable pin tools.

2. Description of Related Art

There are numerous areas of friction stir welding that can be improved because of the difficulties inherent in the process when dealing with metal matrix composites, ferrous alloys, non-ferrous alloys, and superalloys when using a superabrasive tool.

An example of an area in need of development is friction stir welding (FSW) in an underwater environment. Because FSW has such great potential for use with pipe, on-site use of FSW is going to be an important field of use. Specifically, drilling rigs operate in both saltwater and freshwater environments. Both types of water can affect FSW performance. It would be an improvement over the prior art to adapt to these specific and different underwater environments to improve overall FSW performance.

This aspect of underwater FSW relates generally to the issue of fluids that can be used to not only affect the cooling rate of an FSW weld, but the ability to alter microstructure of the resulting weld. Thus it would also be an improvement over the prior art to consider how various liquids and gases can be used to optimize FSW performance in order to improve the FSW process.

Another important aspect of the invention is directly related to the welding of arcuate materials. Specifically, FSW of pipe can be improved by various means and methods.

When dealing with pipe, the pipe itself can be altered to obtain an improved material for use in drilling applications. Specifically, when two pipes are joined on-site, there is typically a wide female end and a thinner and threaded male end. The male and female ends are coupled using the threaded screws to thereby create a longer length of pipe. It would be an improvement over the state of the art to alter the shape of the completed pipe such that it can be more easily inserted into the drill hole, and to optimize the size of a drill head for the resulting completed pipe.

Another aspect of FSW that has been developed pertains to the communications that are required between a control station and various remote spindle heads. While communication is obviously important, it is difficult when dealing with hazardous environments such as near a nuclear containment vessel. It would be an improvement over the prior art to provide an improved communications system for use in both hazardous and non-hazardous environments.

BRIEF SUMMARY OF THE INVENTION

It is an object of the present invention to provide improved tools for use in friction stir welding.

It is another object to provide improved friction stir welding in various underwater environments.

It is another object to provide improved friction stir welding using a variety of gases and liquids to improve friction stir welding.

It is another object to provide improved friction stir welding when dealing with materials that must be qualified in order to be deployed.

It is another object to provide improved friction stir welding of pipe by providing multiple spindle heads for simultaneous friction stir welding.

It is another object to provide improved friction stir welding by providing a means for heating of a friction stir weld joint during welding in order to improve the characteristics of the cooled joint.

It is another object to provide improved methods of friction stir welding of pipes that are being joined together.

It is another object to provide improved friction stir welding by providing a dimple in a support surface when performing welding of pipe.

It is another object to provide improved friction stir welding of pipe by providing different types of tools when friction stir welding with multiple spindle heads.

It is another object to provide improved friction stir welding by providing an improved means of communication when friction stir welding in hazardous and non-hazardous environments.

It is another object to provide improved friction stir welding by providing an independently movable mandrel when friction stir welding pipe.

The present invention is a friction stir welding system that enables clamping of a pipe to enable friction stir welding around the pipe OD, a movable mandrel that provides a counter-force to the pressure exerted on the outside of a pipe by a tool, and a system for providing friction stir welding and repair inside a nuclear vessel in an underwater environment.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings of the invention in which the various elements of the present invention will be numbered and described so as to enable one skilled in the art to make and use the invention. It is to be understood that the following description is only exemplary of the principles of the present invention, and should not be viewed as narrowing the claims which follow.

Figure 1:
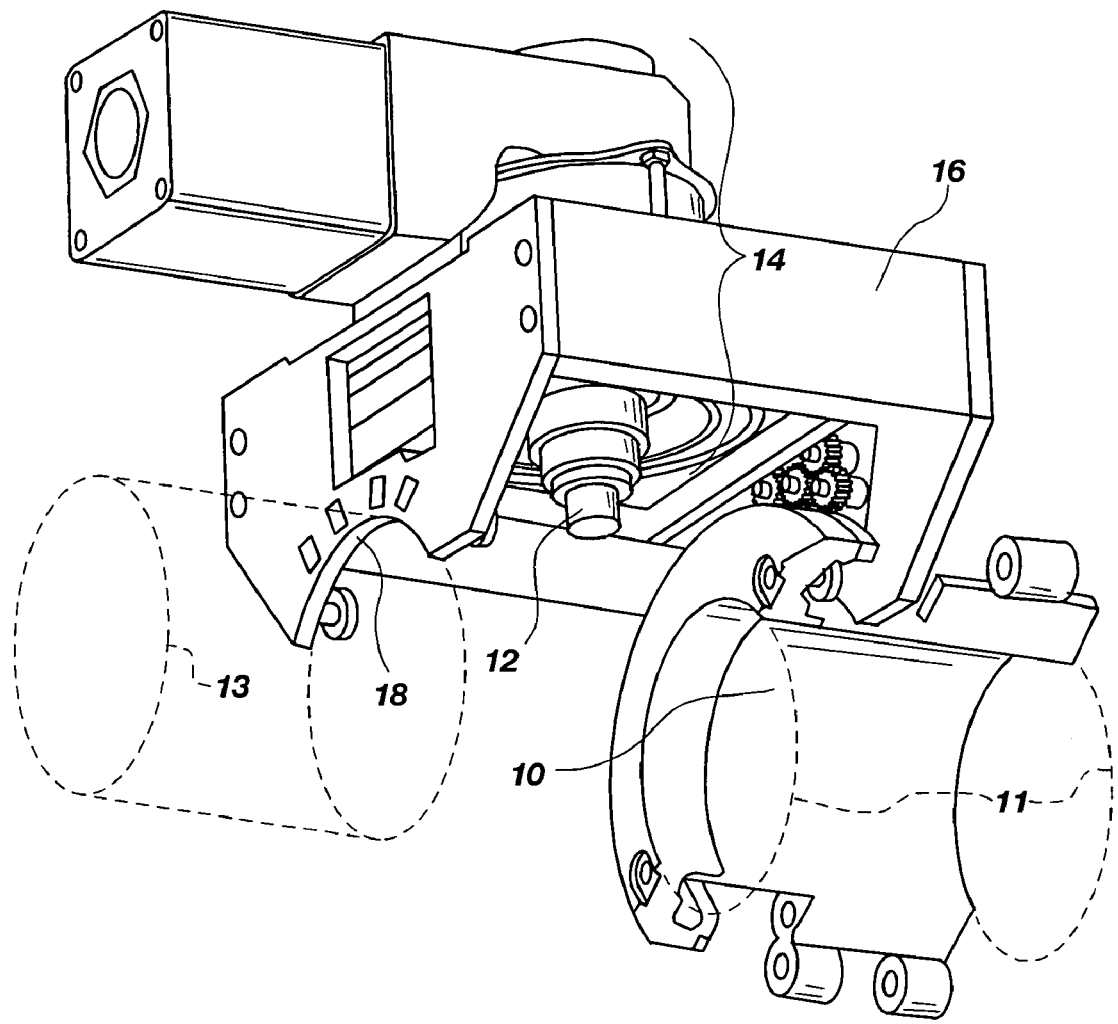
FIG. 1 is perspective view of a friction stir welding tool and one half of one clamp for holding a pipe.

A first embodiment of the invention is a friction stir welding and clamping system that utilizes a first friction stir welding tool including a spindle head disposed so as to weld the OD of a pipe. FIG. 1 shows a partial clamp 10, and the tool 12 being held by the spindle head 14. An opposing clamping member not shown but its beginning and ending positions indicated by dotted lines 11 would hold a first pipe in place between the two clamps 10, 11. Two other clamping members also not shown by indicated by dotted lines 13 would be mounted on the frame 16 at location 18 to hold a second pipe. The tool 12 would be lowered by the spindle head 14 against a joint of the first and second pipes to perform the friction stir welding.

Figure 2:
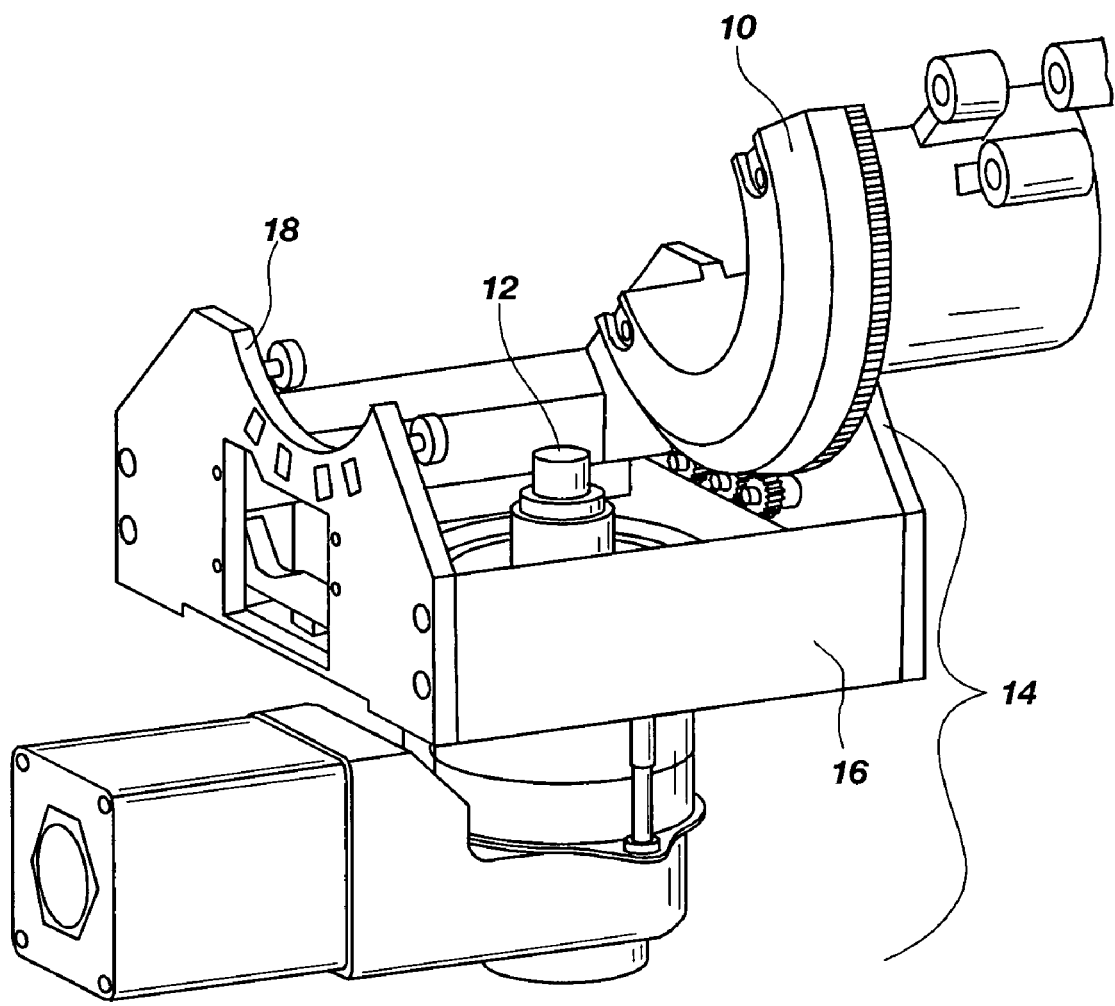
FIG. 2 is another perspective view of the friction stir welding tool and one half of one clamp.
Figure 3:
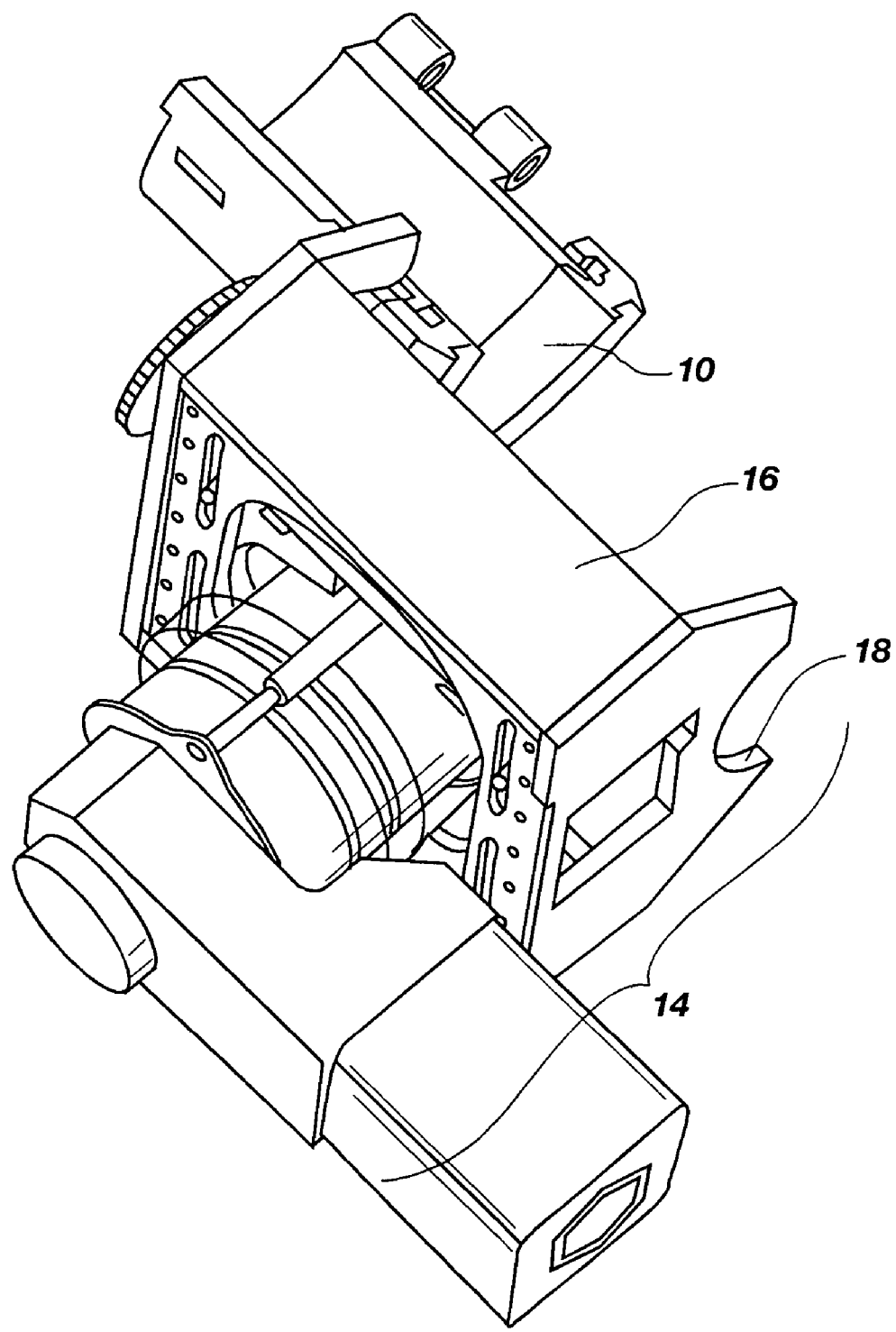
FIG. 3 is another perspective view of the friction stir welding tool and one half of one clamp.
Figure 4:
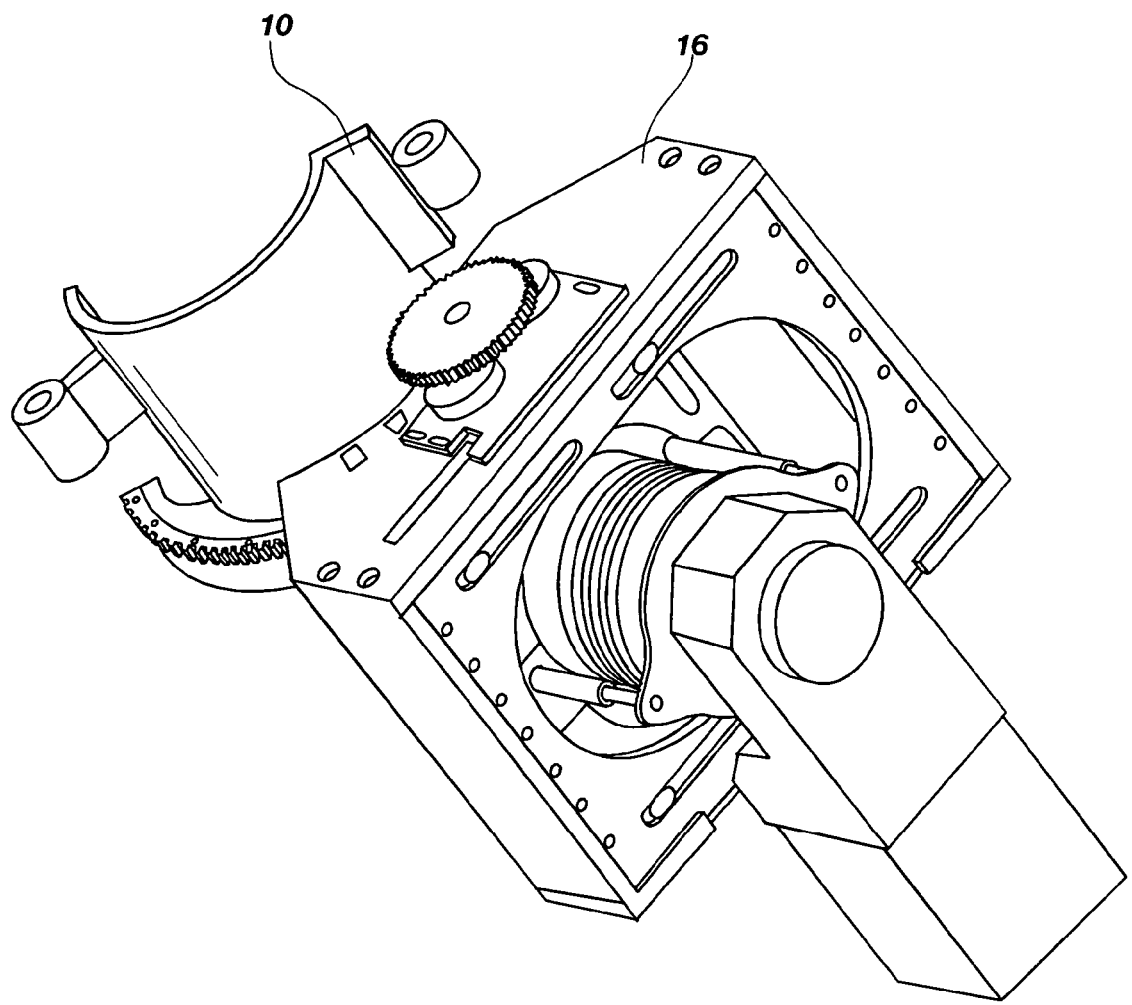
FIG. 4 is another perspective view of the friction stir welding tool and one half of one clamp.

FIGS. 2, 3 and 4 are all provided in order to show various views of the pipe welding system.

Figure 5:
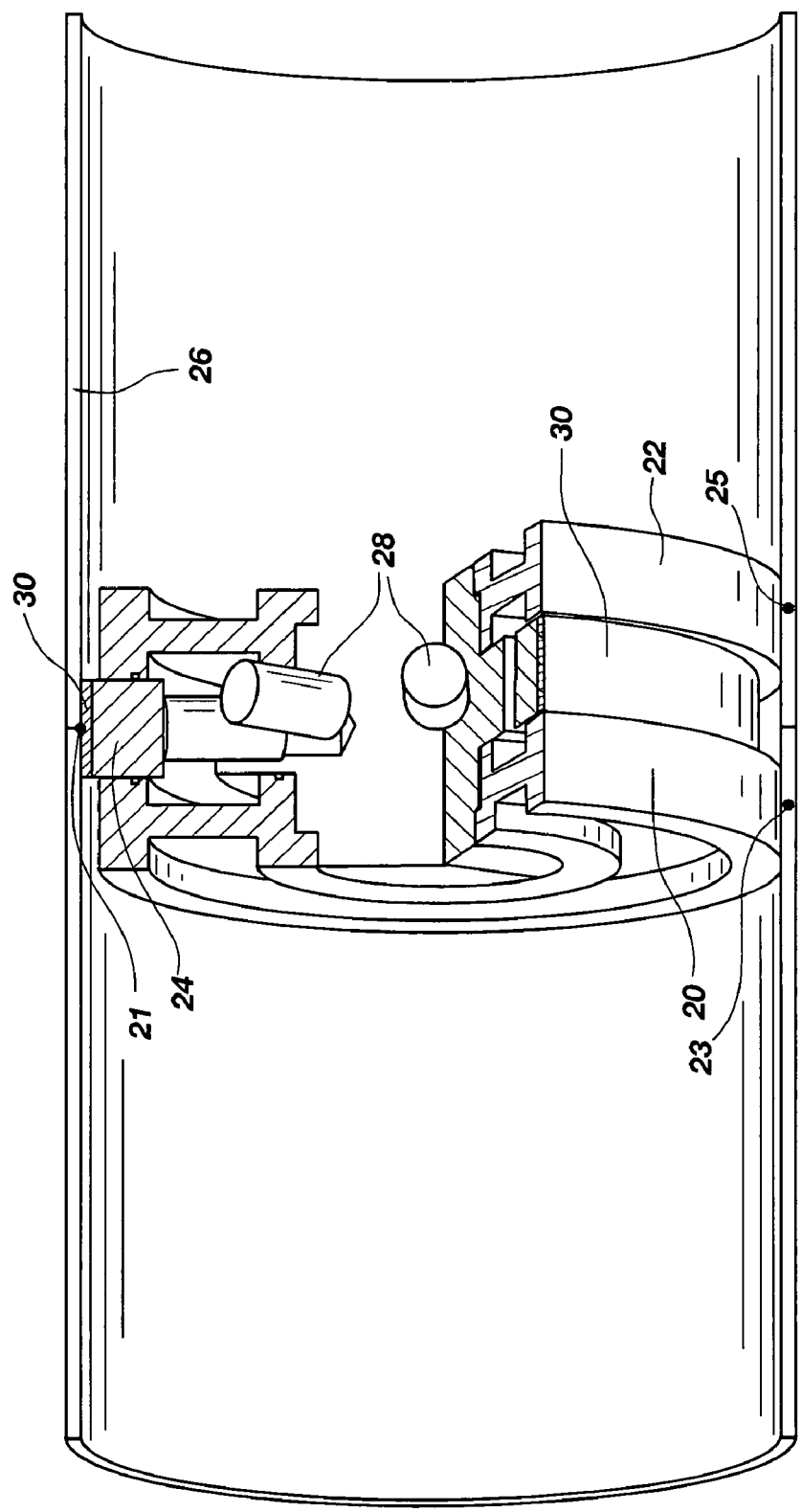
FIG. 5 is a cut-away perspective view of a portion of the movable mandrel including the plurality of pistons and three hoops.
Figure 6:
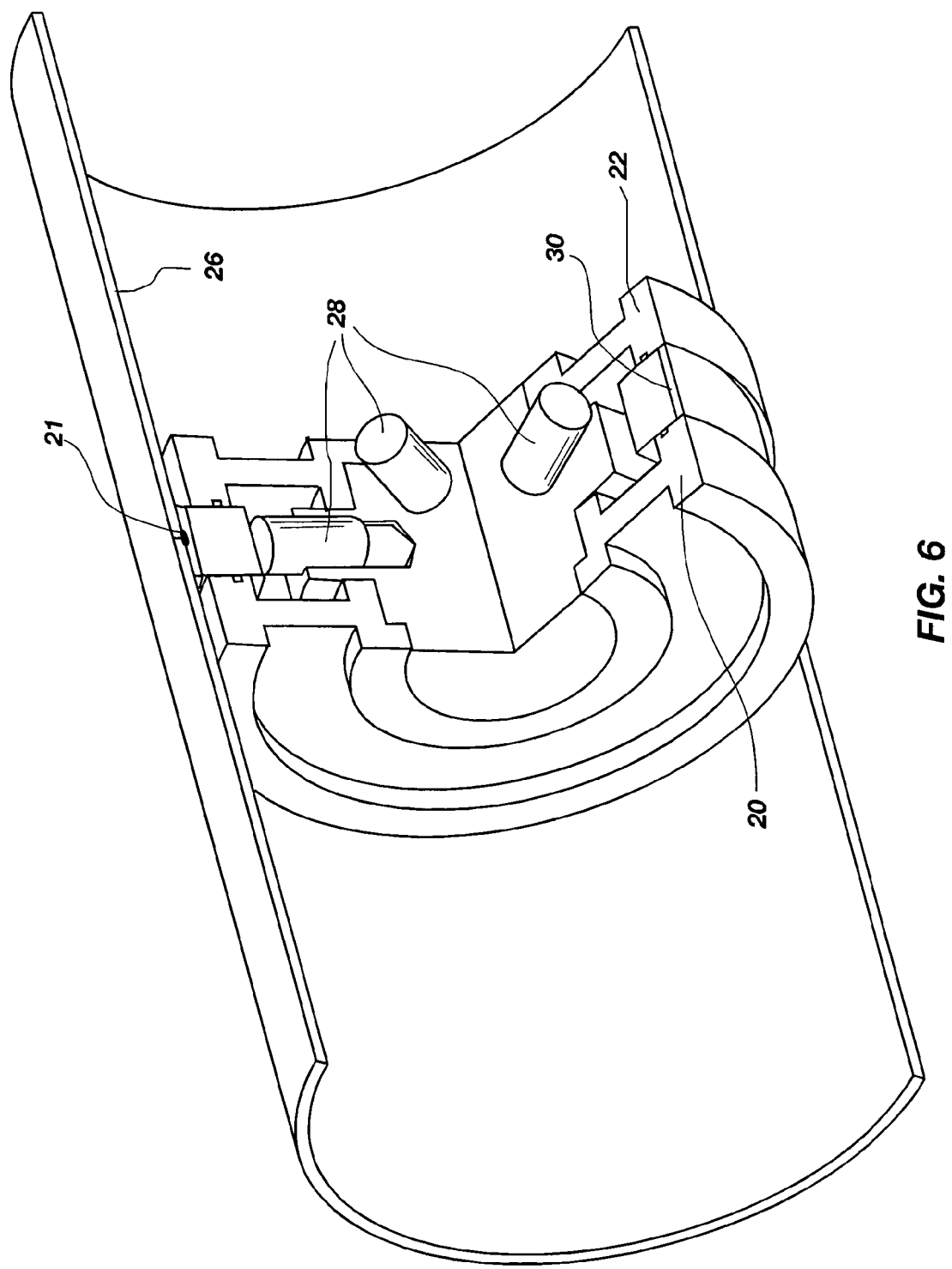
FIG. 6 is a cut-away perspective view of a portion of the movable mandrel including the plurality of pistons and three hoops.

FIGS. 5 and 6 are provided as illustrations of an anvil that is disposed inside a pipe. The anvil provides a counteracting force to prevent the tool on the OD of the pipe from crushing the pipe. The anvil is comprised of two outer hubs 20, 22, and an inner wheel 24. The inner wheel 24 is forced against the ID of the pipe 26. In practice, it has been determined that several pistons 28 are actuated in order to force the wheel against the ID of the pipe 26. The wheel 24 functions as an anvil that provides a counter-force for the friction stir welding processing being performed on the OD of the pipe 26.

At present, three pistons 28 are actuated, while five remaining pistons 28 are non-actuated. This force of the pistons 28 on the inside of the wheel 24 forces the wheel against the ID. Three pistons 28 are used because of the ability to spread the force out along a length of the pipe 26 ID.

The opposing force of the hubs 20, 22 can be seen to form a triangular force in these figures, with a first point of contact 21 on the ID of the pipe 26 made by the wheel 24, and the other two points of contact 23, 25 being made by the two hubs 20, 22.

It is also shown that the wheel 24 may have another material 30 disposed between the wheel 24 and pipe 26 ID. This material may provide important benefits by being consumable. Other structural elements may include a dimple for helping to remove any root defects in the weld.

Figure 7:
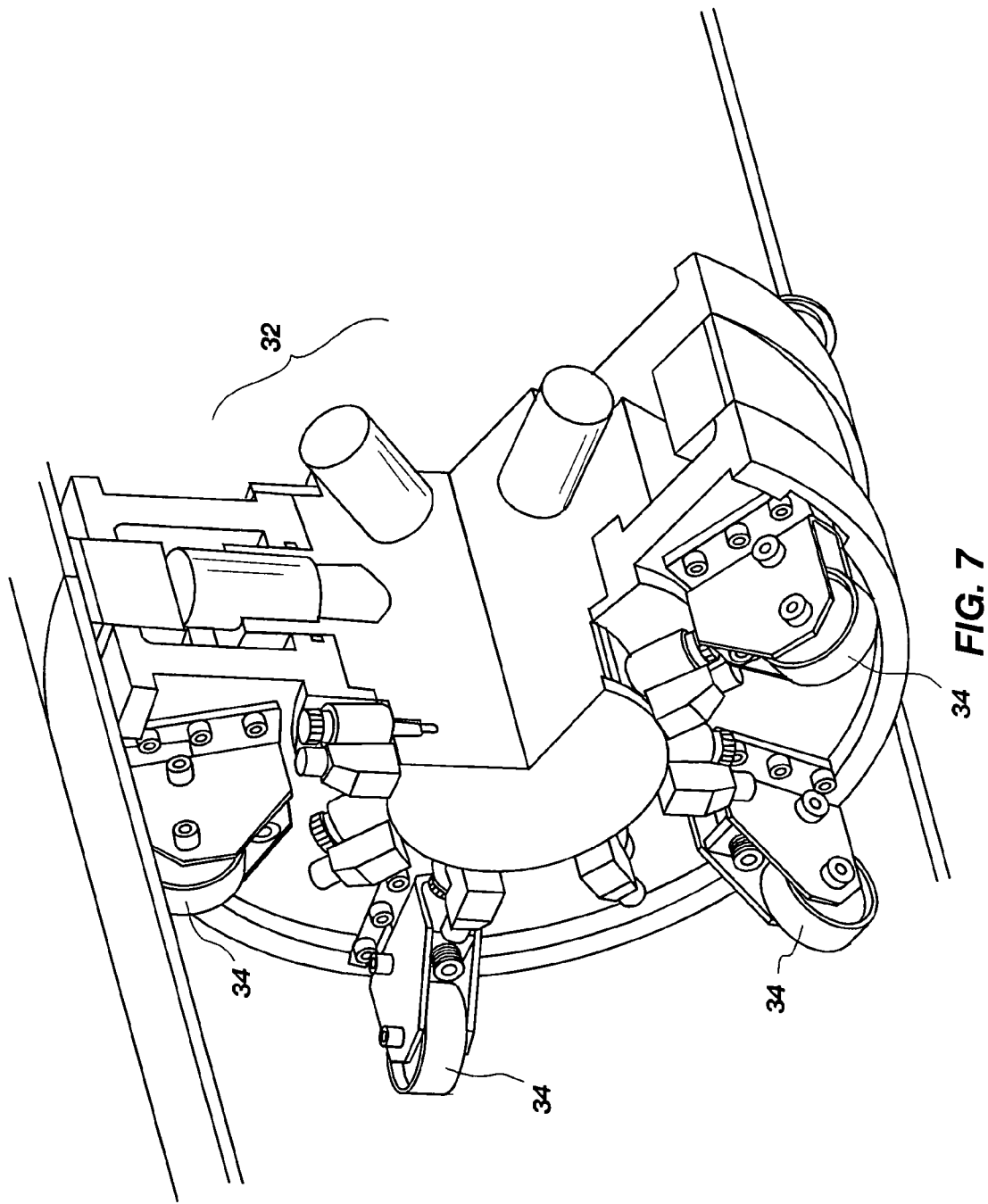
FIG. 7 is a close-up and cut-away perspective view of a portion of the movable mandrel including the plurality of pistons and three hoops.
Figure 8:
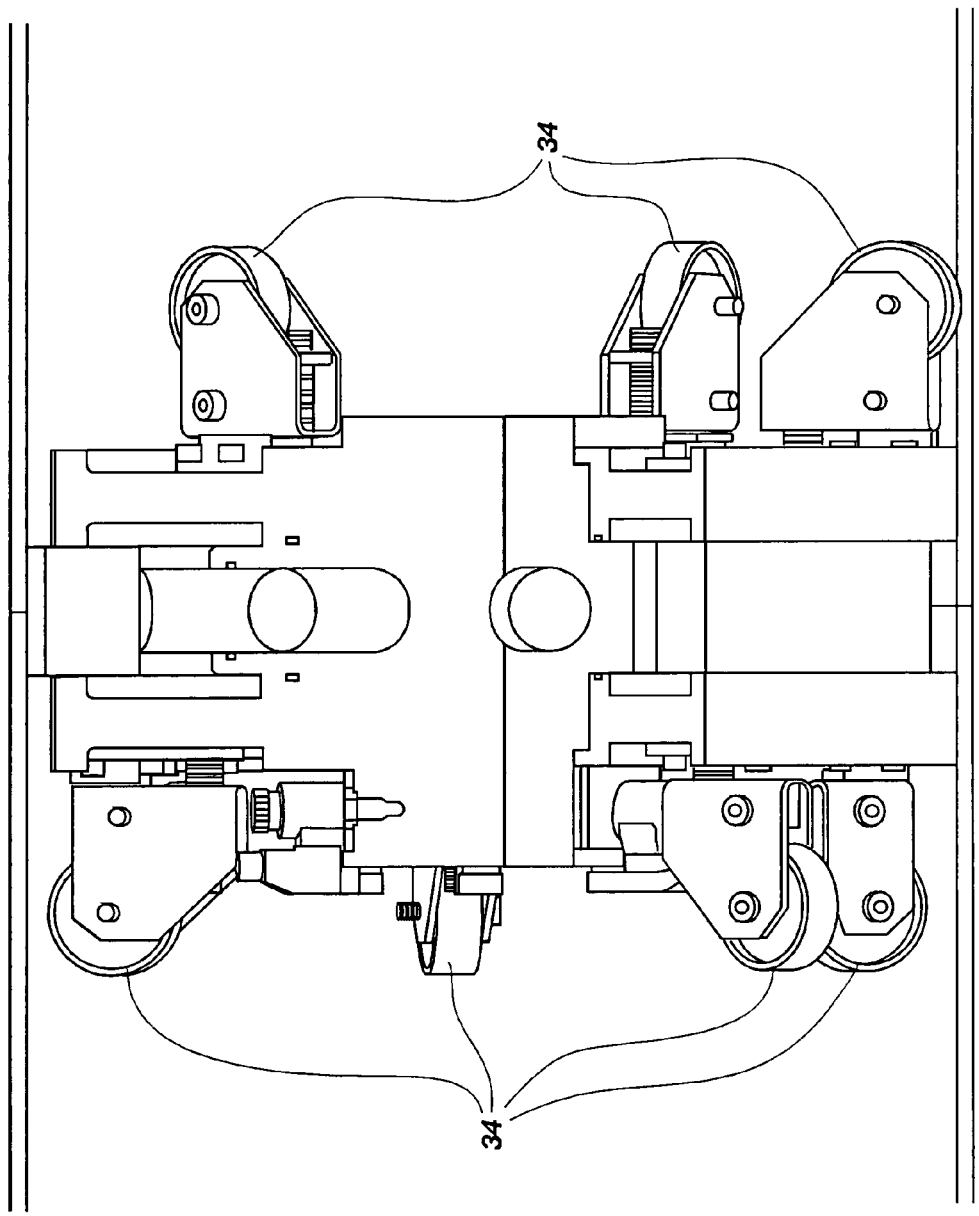
FIG. 8 a close-up and cut-away perspective view of a portion of the movable mandrel including the plurality of pistons and three hoops.

FIGS. 7 and 8 are provided to illustrate that the wheel 24 and the hubs 20, 22 are an assembly 32 that can be moved along the length of the pipe 26. Means of movement is provided by the rollers 34 mounted to the hubs 20, 22. The rollers 34 are mounted on springs. When the pistons 28 are engaged, the springs of the rollers 34 are compressed and the assembly 32 will not move. When the pistons 28 are disengaged, the springs center the wheel 24 and hubs 20, 22 in the pipe 26 so that the assembly 32 can be moved in either direction along the length of the pipe 26.

Figure 9:
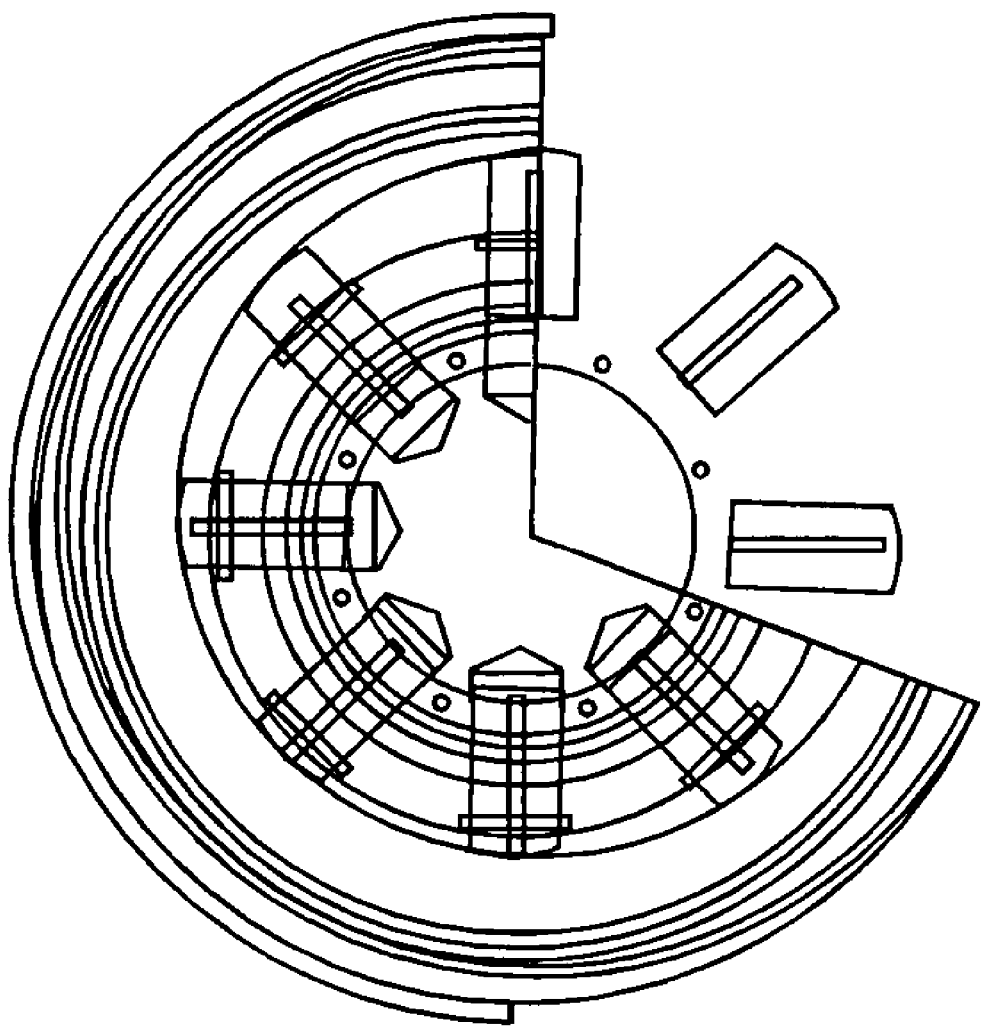
FIG. 9 is a cut-away perspective view of a portion of the movable mandrel including the plurality of pistons and three hoops.

FIG. 9 is provided as another view of the wheel and hub assembly 32.

Figure 10:
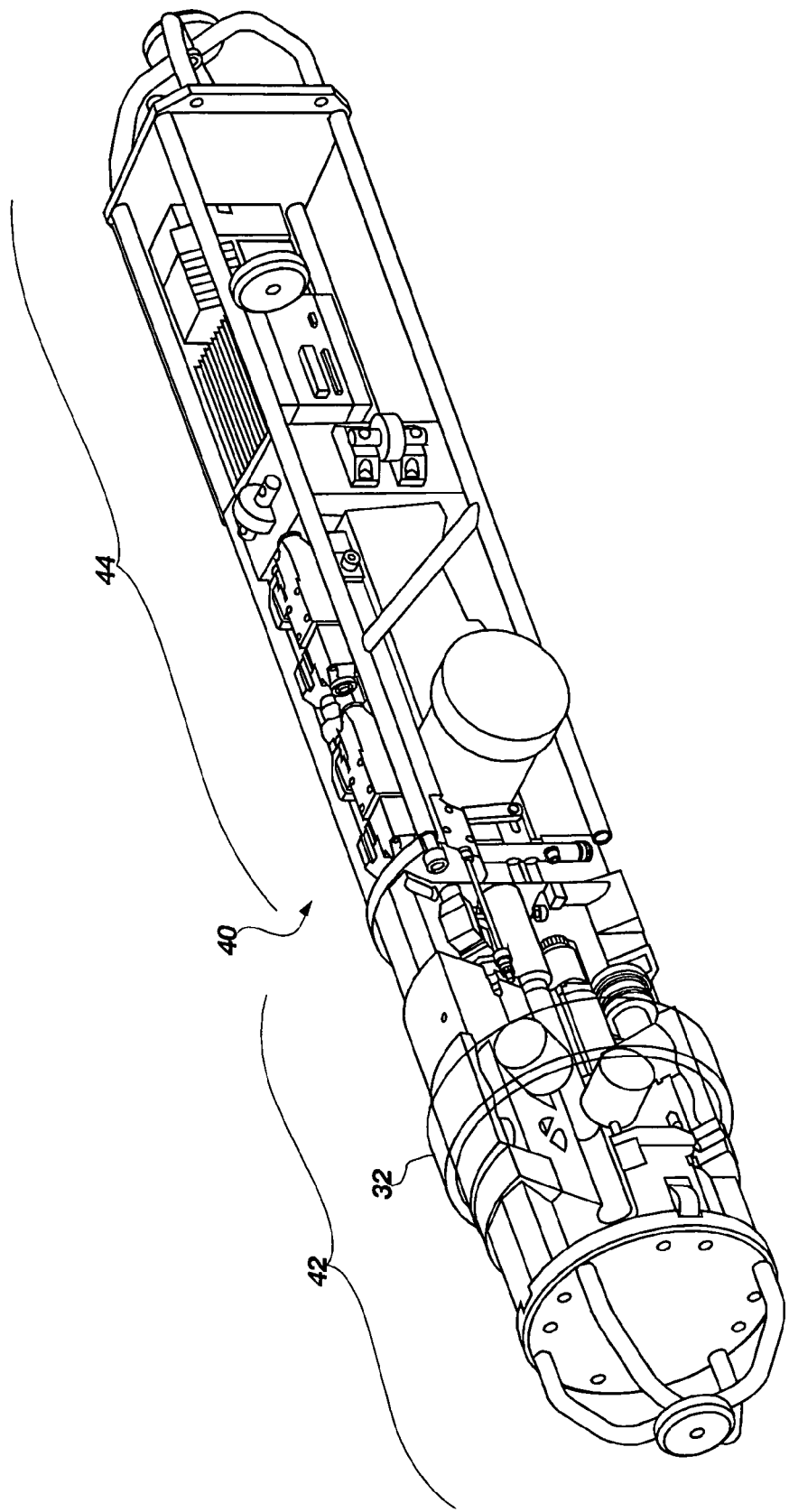
FIG. 10 is a perspective view of the movable mandrel.

FIG. 10 is provided as an overall view of a mobile mandrel 40. The mandrel 40 functions as the device for carrying the wheel and hub assembly 32 along the inside of the pipe 26. Accordingly, the mandrel includes a working end 42 that contains the components necessary for operating the wheel and hub assembly 32, and a drive end 44 that contains the components necessary for moving the mandrel 40 along the inside of the pipe 26.

Figure 11:
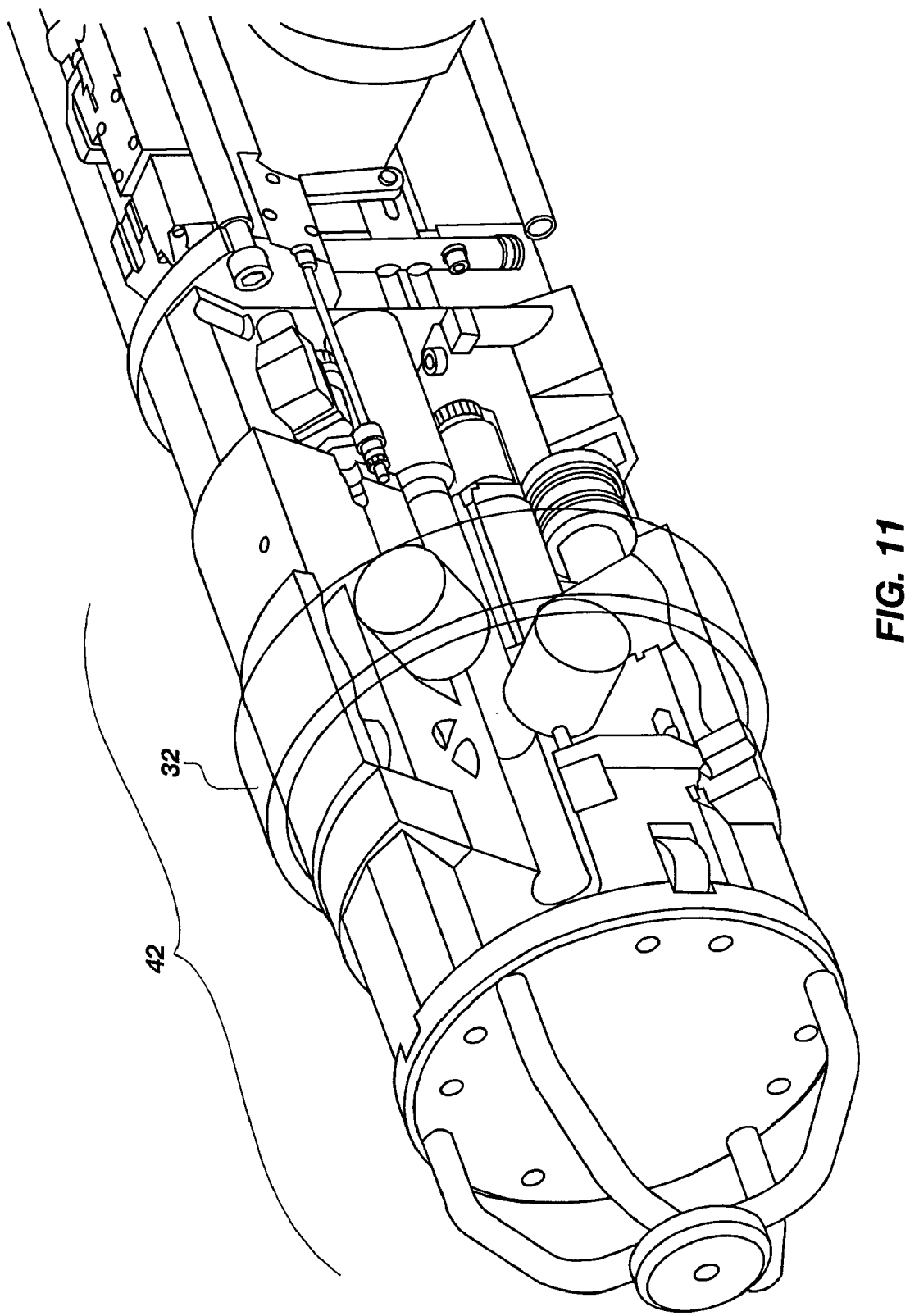
FIG. 11 is a close-up and perspective view of a portion of the movable mandrel.
Figure 12:
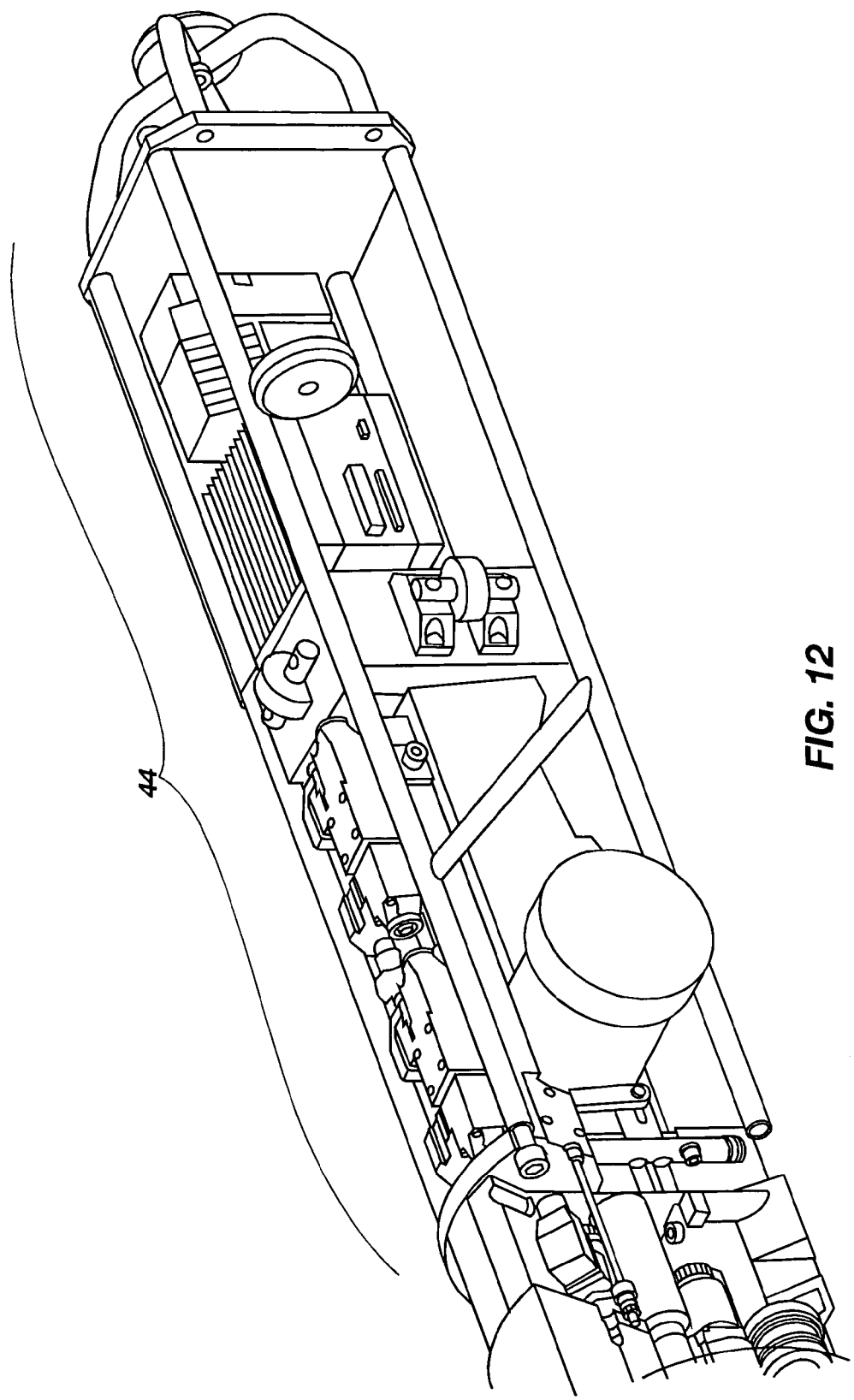
FIG. 12 is a close-up and perspective view of a portion of the movable mandrel.

FIGS. 11 and 12 are close-up views of the two ends 42, 44 of the mandrel 40.

FIGS. 5 through 11 describe the mandrel 40 that enables friction stir welding of a pipe by providing a counter force to the tool 12. Another embodiment of the invention is to provide a second spindle head and tool on a mandrel. In this way, friction stir welding is performed simultaneously on both the OD and the ID of the pipe, the action of friction stir welding providing the opposing forces.

In another embodiment, the inside friction stir welding process may be more limited. For example, a penetration tool might not be used. Instead, a tool having a shoulder could be used to provide the opposing force. While not providing penetration, the shoulder would still press against the ID of the pipe and affect the nature of the resulting weld. This could be important by providing an annealing affect. Likewise, the friction stir welding process on the OD could be performed by a shoulder tool, and a penetrating tool could be used on the pipe ID.

In another embodiment of the invention, the spindle head or tool holder assembly could be modified to function as the shoulder of a penetrating tool. Thus, a tool tip would be disposed in a tool holder, instead of replacing a tool that includes a shoulder and tip. This could dramatically reduce the costs of performing friction stir welding by enabling the less costly replacement of just a tool tip as opposed to replacing a tool that includes a shoulder and tip.

It should be considered another aspect of the invention that refractory metals may also be included within the materials used as a coating on a tip, a tip and shoulder, or as the entire material in the tip or tip and shoulder.

When dealing with the welding of pipes, it is important to consider the environments in which pipe is welded. Of particular importance to the present invention is the ability to perform friction stir welding underwater. However, pipes are not the only structures that require or could benefit from underwater welding. It has been determined that friction stir welding is a viable method to perform a weld or to repair existing cracks in ships, underwater pipelines, submerged nuclear reactor containment structures, and many other underwater structures where cracking can be present.

While previous applications have only discussed friction stir welding in air, a vacuum, or environments where gases other than air are present, it is an aspect of the present invention to teach the principles of underwater friction stir welding.

Before performing friction stir welding underwater, there was significant discussion as to what might happen. Dealing with a relatively large amount of heat in direct contact with water raises the possibility of a significant and violent reaction if steam is rapidly created. The other unknown factor was the aspect of how cooling by the water would affect the nature of the weld.

Surprisingly, friction stir welding underwater is not a violent event. The most noticeable affect is that a small amount of air bubbles are created. Thus, the act of friction stir welding does not in itself create any new dangers.

One surprising aspect of friction stir welding is the affect that the water has on the weld itself. Specifically, the nature of the resulting underwater weld is one that is generally softer, as is understood by those skilled in the art.

Another characteristic of the resulting weld is a change in the microstructure. Specifically, by keeping the joint cooler than if the process were being performed in air, the weld is superior.

A last observation regarding the weld is that the flow of materials to the joint is changed. In other words, altering the temperature of the environment around the joint alters the flow of material back into the weld. It is noted that this change in flow of materials can be used to the benefit or detriment of the materials.

The potential benefits of underwater welding to the pipeline industry in particular are especially compelling. For example, the superior welds that result from underwater friction stir welding will result in new pipelines being in better condition as they are manufactured and installed.

For example, consider the phenomenon that is known in the industry as a kissing bond. At the weld root, a very short length of the weld interface, as small as 30 to 50 micrometers, may be in intimate contact but without true metallurgical bonding. Even this small flaw can drastically reduce mechanical properties of the pipe, not only requiring repair or replacement of the pipe much earlier than expected, but can even result in catastrophic failure. Thus, friction stir welding during installation or repair may be materially assisted when performed underwater.

Not surprisingly, there are thousands of miles of existing pipeline with cracks and poor fusion welds already in place throughout the world. The existing pipeline can also substantially benefit from the present invention when it is used to repair cracks. Thus, the present invention includes the ability to repair cracks on arcuate surfaces, such as the OD and the ID of the pipe.

Another important aspect of the present invention is to enable remote repair. This need is demonstrated by the location of some of the pipelines currently in use. The environment may be too small for a person, or too hazardous. Thus, the present invention of a system that uses a mandrel to enable friction stir welding of pipe enables repair instead of replacement. The system including a mandrel can also be deployed in underwater environments.

Fluids other than water can also be used around the site of friction stir welding. These fluids may all be used for cooling, affecting the flow of material at the weld, and altering the microstructure of the weld. The nature of the fluids themselves, such as temperature and viscosity can all be modified to enhance the friction stir welding process. These other fluids include oil, but should also be considered to include various gases as well. Fluids can also be selected to influence the rate of cooling of the weld, again affecting the properties of the resulting weld.

Annealing of a weld can also be performed after friction stir welding. For example, directing heat to the weld can affect the fracture toughness or hardness of a weld.

One means of directing heat to a site before or after friction stir welding can be performed by a non-contact infra-red device. Such a device can slow the rate of cooling, and result in a superior weld.

Another non-contact means of directing heat to a site can be through the application of resistive or inductively induced heat from electric or magnetic fields.

Another aspect of the present invention is directed to pipes that are being coupled together on an oil rig. When pipes are mated, a female end is typically formed as a wider end with a lip or swage. The pipe being connected is threaded and may be tapered. The pipes are screwed together to form a mechanical bond. However, the drill bit that must be used to make the hole for the pipe must be at least as wide as the lip or swage around the pipe, and not the smaller diameter of the pipe itself. Thus, it would be an improvement to enable pipes to be friction stir welded on-site as the pipe is pushed into a bore hole.

Figure 13:
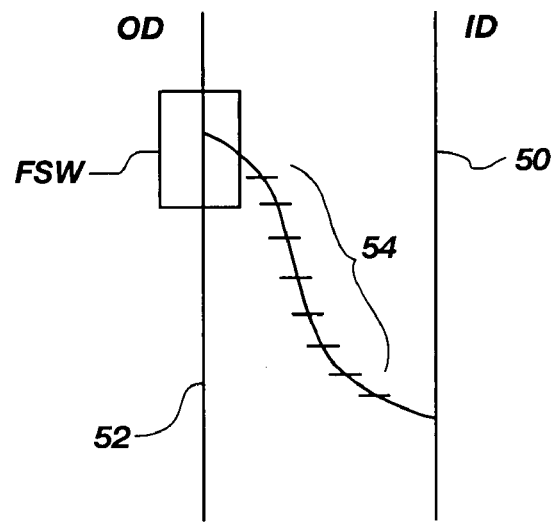
FIG. 13 is a cut-away view of the joint between two pipes.
Figure 14:
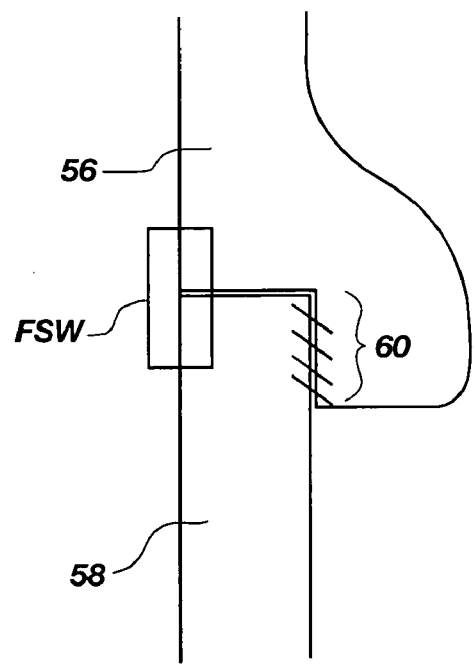
FIG. 14 is a cut-away view of the joint between two pipes.

As shown in FIG. 13, an external or external and internal friction stir welding process can be applied to a pipe. The pipes 50, 52 can still be threaded 54, and coupled together. Alternatively, the lip or swage might be disposed internally on a pipe 56 as shown in FIG. 14. The pipes 56, 58 may even be threaded as shown at 58.

Figure 15:
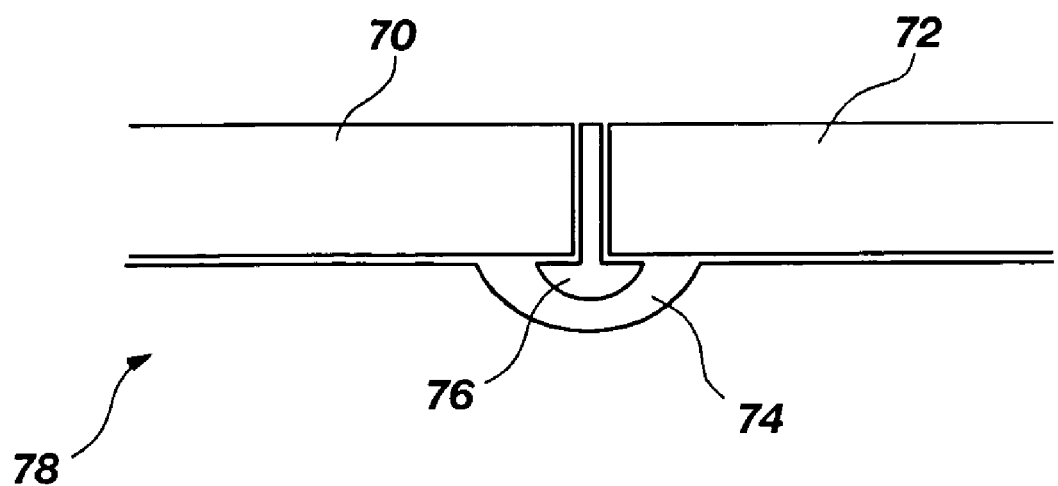
FIG. 15 is a cut-away view of a dimple disposed in a mandrel.

FIG. 15 is provided to illustrate two aspects of the present invention. The first concept is that pipes 70, 72 have an insert 76 disposed between them. The insert 76 is used to introduce a new material at the weld. The weld is being performed on an anvil 78 that has a dimple disposed along the weld to allow the insert 76 to be used, or to enable a tool to perhaps penetrate further into the pipes 70, 72 being joined to thereby prevent root defect.

The present invention also utilizes a communications network to enable remote operation of a mandrel in a pipe, so that the mandrel inside and a friction stir welding tool on the outside can be coordinated in their operation. Coordination of application of force is critical in order to ensure that the mandrel is providing the support underneath the tool to prevent a pipe from being crushed. The preferred communication network is cable-based. Using cable is important in hazardous environments, such as in the presence of large amounts of radiation, or underwater, where radio frequencies may be disrupted. A single line can transport all communications necessary between the mandrel and a control system for the tool in order to coordinate operation.

Many of the aspects of operation of the present invention include operation in hazardous environments such as in high radiation. The present invention is capable of welding and repairing cracks in high melting temperature alloys such as 304L and 316L stainless alloys.

Figure 16:
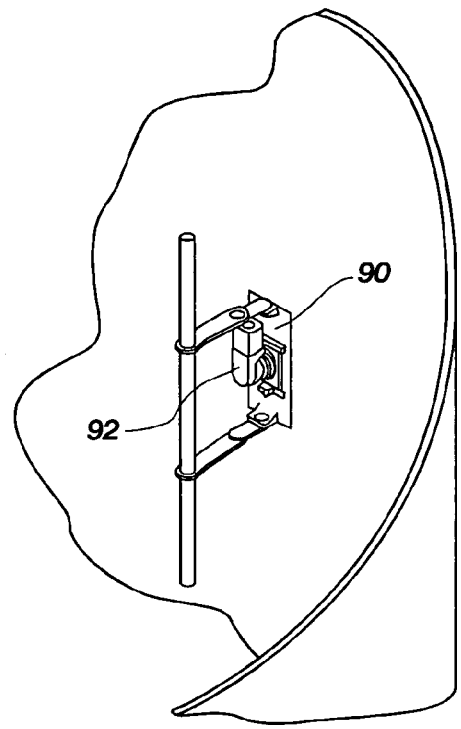
FIG. 16 is a perspective view of a tool disposed on a nuclear vessel wall.
Figure 17:
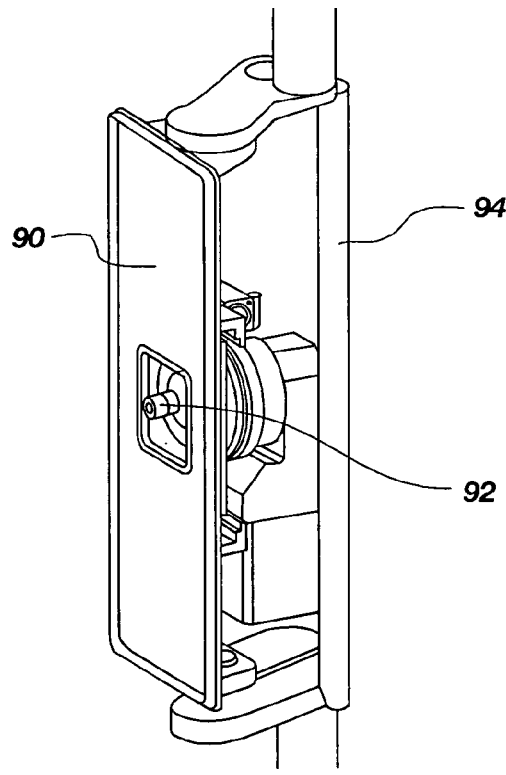
FIG. 17 is a close-up perspective view of the tool and attaching vacuum plate.

The present invention utilizes a vacuum plate 90 to secure a friction stir welding machine 92 to the ID of a nuclear vessel, for example, as shown in FIGS. 16 and 17. The vacuum plate 90 is positioned remotely by extensions 94 to the surface of the vessel so it can be securely attached. An optical device (not shown) is disposed near the friction stir welding tool 92 to position the vacuum plate 90, locate the crack, and provide real-time visual feedback of the crack repair. There is no bright light from friction stir welding nor is vapor flashed from the tool 92 during underwater friction stir welding.

Figure 18:
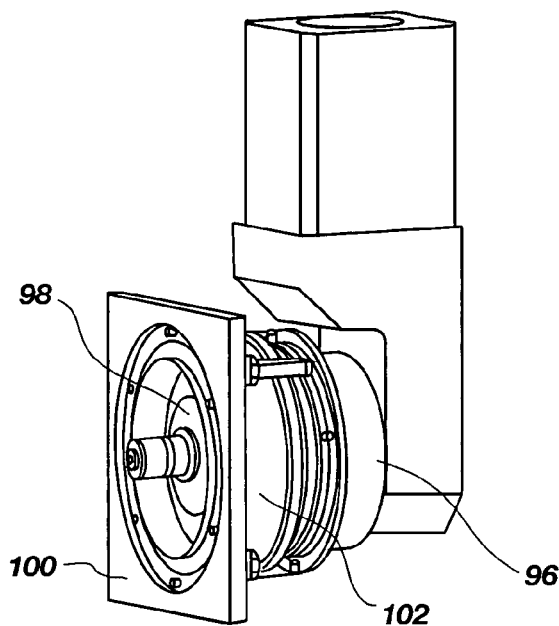
FIG. 18 is a close-up perspective view of the tool.
Figure 19:
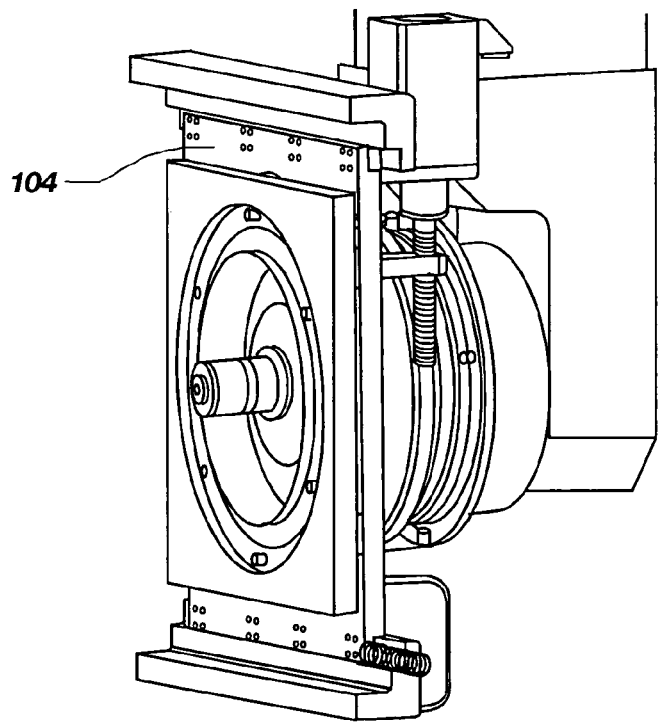
FIG. 19 is a close-up perspective view of the tool.

The Z axis or tool axis is controlled by a hydraulically actuated piston 96 that is attached to the spindle 98 as shown in FIG. 18. The piston moves within a cylinder 102 that is attached to a Y axis plate 100. The Y axis plate 100 is attached to an X axis plate 104 and is free to move in the Y axis direction. The X axis plate 104 is attached to the vacuum plate 90 and is free to move in the X axis direction. Both plates 100, 104 are driven by motors that position the tool 92 during friction stir welding as shown in FIG. 19.

Figure 20:
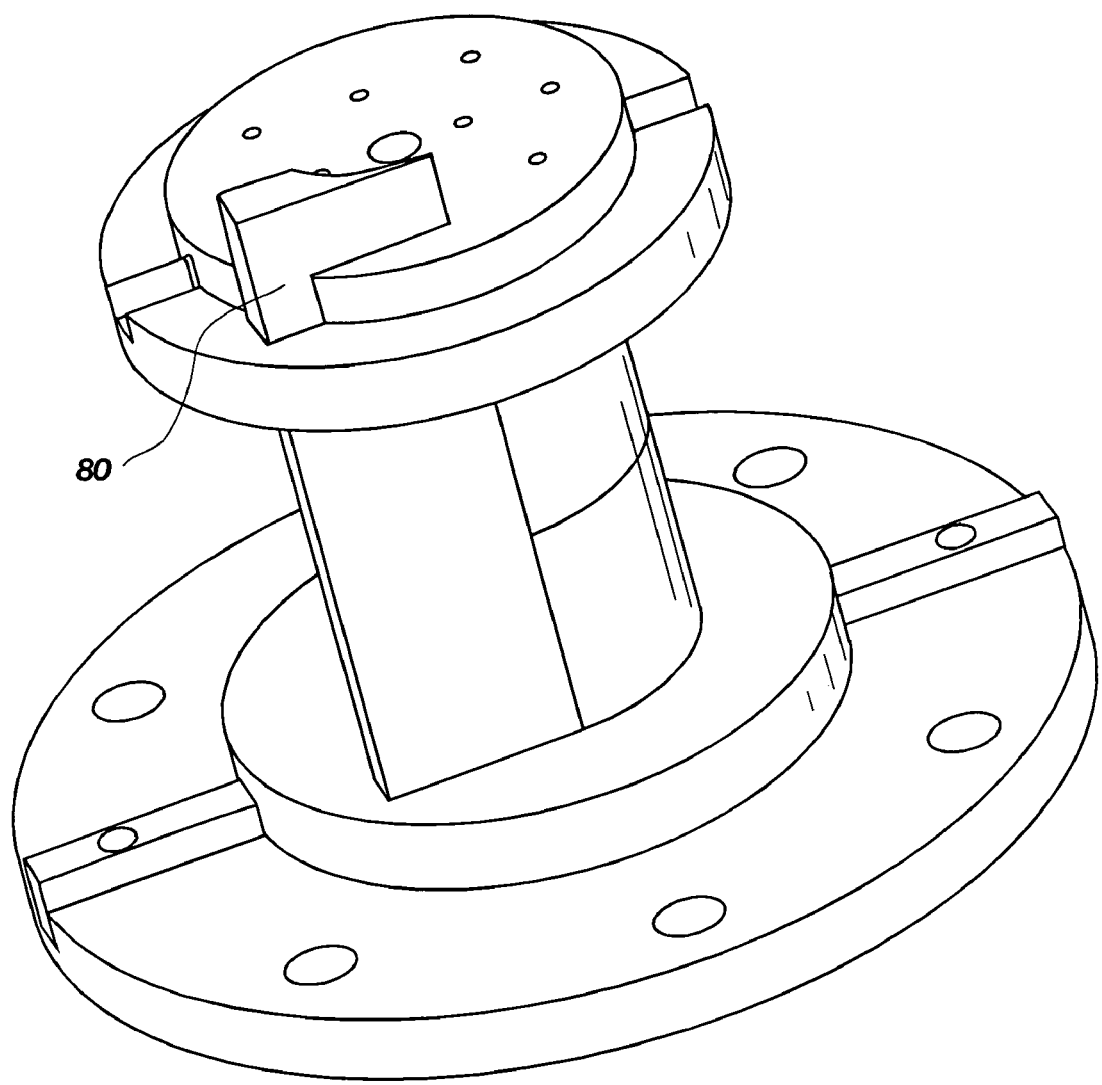
FIG. 20 is a perspective view of a run-off tab on a pipe.

FIG. 20 is provided to illustrate another aspect of the present invention. A run-off tab 80 is shown being tangential to a pipe. A friction stir welding tool completes its weld by moving onto the run-off tab to thereby prevent damage to the pipe when the tool is removed from the weld site. Consequently, the material of the run-off tab is likely to become part of the pipe, and thus the material for the run-off tab must be chosen appropriately. It may or not be the same material as the structure being welded. For example, it may be desirable to introduce different materials into the weld.

Another aspect of the present invention is the ability to remove a step from the qualifying process when dealing with critical welds. Qualifying is the process for verifying that a weld has been performed correctly. Typically, a large portion of the welds may need to be x-rayed or otherwise meticulously inspected in order to verify the integrity of the weld. It is an aspect of the present invention that the reliability of a friction stir weld is so great that the step of qualifying is not necessary, even when the weld is to be used in a highly volatile environment.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A friction stir welding system that is capable of functionally friction stir welding high melting temperature materials, said system comprising:

a friction stir welding tool having a superabrasive material disposed on a pin of the friction stir welding tool, wherein the superabrasive material is manufactured under an ultra high temperature and an ultra high pressure process; and a movable mandrel disposed opposite the friction stir welding tool, to thereby create a counter-force to a pressure exerted by the friction stir welding tool on the high melting temperature materials, to thereby prevent damage to the high melting temperature materials, said movable mandrel further comprising:

an anvil for generating at least three points of contact between the movable mandrel and an inside diameter (ID) of a pipe formed from the high melting temperature materials, wherein a middle one of the at least three points of contact is directly opposite the friction stir welding tool that is pressing against the outside diameter (OD) of the pipe, and two outer points of contact are disposed against an opposite side of the pipe ID, and not against a seam.

2. The system as defined in claim 1 wherein the movable mandrel is capable of movement along a length of the pipe.

3. The system as defined in claim 2 wherein the movable mandrel is capable of movement around the inside diameter (ID) of the pipe.

4. The system as defined in claim 3 wherein the system is further comprised of a control system to control movement of the friction stir welding tool and the movable mandrel.

5. The system as defined in claim 4 wherein the system is further comprised of a hardwired communications cable disposed between the movable mandrel and the control system, and between the friction stir welding tool and the control system, to thereby enable control over positioning of the movable mandrel with respect to the friction stir welding tool in harsh environments.

6. The system as defined in claim 1 wherein the system is further comprised of an external clamping system for holding ends of two pipes together in a position that is suitable for friction stir welding of two pipes.

7. The system as defined in claim 6 wherein the external clamping system is further comprised of a first clamp for holding a first pipe, and a second clamp for holding a second pipe.

8. The system as defined in claim 7 wherein the external clamping system is further comprised of means for rotating the two pipes to enable the friction stir welding tool to remain stationary while the two pipes are rotated underneath the friction stir welding tool.

9. The system as defined in claim 7 wherein the clamping system is further comprised of means for rotating the friction stir welding tool while the two pipes are held stationary.

10. The system as defined in claim 8 wherein the movable mandrel is disposed inside the two pipes to prevent damage to the two pipes when the friction stir welding tool is welding the ends of the two pipes together.

11. The system as defined in claim 1 wherein the anvil for generating the at least three points of contact between the movable mandrel and the ID of the pipe is further comprised of a plurality of pistons, wherein the plurality of pistons are independently controllable to thereby enable at least three to always be in contact with the ID of the pipe.

12. The system as defined in claim 11 wherein anvil is further comprised of at least three hoops, wherein the at least three hoops are pushed by the plurality of pistons, wherein a middle hoop is disposed so as to apply a force opposite the friction stir welding tool, and wherein at least two outer hoops are disposed against an opposite wall of the pipe ID so as to provide a counter-force to the middle hoop.

13. The system as defined in claim 12 wherein the at least three hoops can be moved around the ID of the pipe by the plurality of pistons.

* * * * *